(12) United States Patent
McCaughey et al.

(10) Patent No.: US 10,175,342 B2
(45) Date of Patent: Jan. 8, 2019

(54) DISPERSIVE TARGET IDENTIFICATION

(71) Applicant: FirstGuard Technologies Corporation, Fairfax, VA (US)

(72) Inventors: Dennis McCaughey, Springfield, VA (US); Shantanu Sanyal, Falls Church, VA (US); James Steven Pressnall, Washington, DC (US)

(73) Assignee: FirstGuard Technologies Corporation, Fairfax, VA (US)

( * ) Notice: Subject to any disclaimer, the term of this patent is extended or adjusted under 35 U.S.C. 154(b) by 436 days.

(21) Appl. No.: 15/070,235

(22) Filed: Mar. 15, 2016

(65) Prior Publication Data

US 2016/0274218 A1 Sep. 22, 2016

Related U.S. Application Data

(60) Provisional application No. 62/134,502, filed on Mar. 17, 2015.

(51) Int. Cl.
| | |
|---|---|
| *G01S 7/41* | (2006.01) |
| *G01S 13/34* | (2006.01) |
| *G01S 13/24* | (2006.01) |
| *G01S 13/04* | (2006.01) |

(52) U.S. Cl.
CPC ............ *G01S 7/414* (2013.01); *G01S 13/24* (2013.01); *G01S 13/34* (2013.01); *G01S 13/04* (2013.01)

(58) Field of Classification Search
CPC ........... G01S 13/931; G01S 2013/9375; G01S 2013/9378; G01S 13/88; G01S 2007/358; G01S 7/282; G01S 7/354; G01S 1/045; G01S 7/285; G01S 7/42; G01S 15/8913; G01S 2007/2886; G01S 7/288; G01S 7/2926; G01S 7/411; G01S 7/414; G01S 13/04; G01S 13/0209; G01S 13/24; G01S 13/64; G01S 15/18; G01S 13/56; G01S 1/02; G01S 13/4409; H01Q 25/02
See application file for complete search history.

(56) References Cited

U.S. PATENT DOCUMENTS

| | | | | |
|---|---|---|---|---|
| 5,294,933 | A * | 3/1994 | Lee ..................... | G01S 13/0209 342/159 |
| 2008/0088498 | A1 * | 4/2008 | Suzuki ..................... | G01S 3/74 342/90 |
| 2011/0279305 | A1 * | 11/2011 | Lellouch ................. | G01S 7/003 342/107 |
| 2013/0088383 | A1 * | 4/2013 | Forstner ............... | H01Q 1/3233 342/175 |

(Continued)

*Primary Examiner* — Olumide Ajibade Akonai
(74) *Attorney, Agent, or Firm* — David Grossman

(57) ABSTRACT

A first frequency agile waveform and additional frequency agile signal waveform(s) having in-phase and a quadrature phase components, each shifted by a different delta frequency, are transmitted in the direction of a possible dispersive target. Return signal(s) each comprising an in-phase component and a quadrature phase component associated with each of the frequency agile waveform(s) are received. The return signal(s) associated with the frequency agile signal waveform(s) are phase shifted by their respective delta frequenc(ies). A combined return signal is generated by combining the first return signal and the additional phase shifted return signal(s). A probability of a potential target is determined when the combined return signal exceeds a threshold.

23 Claims, 17 Drawing Sheets

(56) References Cited

U.S. PATENT DOCUMENTS

| | | | |
|---|---|---|---|
| 2013/0113653 A1* | 5/2013 | Kishigami | G01S 7/285 342/189 |
| 2015/0168546 A1* | 6/2015 | Nakagawa | G01S 7/282 342/21 |
| 2015/0185314 A1* | 7/2015 | Corcos | G01S 13/34 342/200 |
| 2016/0245913 A1* | 8/2016 | Park | G01S 13/95 |
| 2017/0160381 A1* | 6/2017 | Cho | G01S 13/90 |

* cited by examiner

| Symbols | |
|---|---|
| $v_t$ | Target Velocity |
| $R$ | Target Range |
| $x_i^{(k)}(t)$ | Transmitted Waveform |
| $y_i^{(k)}(t)$ | ReceivedSignal |
| $z_i^{(k)}(t)$ | Reference Waveform to I channel |
| $z'_i{}^{(k)}(t)$ | Reference Waveform to Q Channel |
| $m_i^{(k)}(t)$ | I Channel Mixer Output |
| $m'_i{}^{(k)}(t)$ | Q Channel Mixer Output |
| $m_i^{(k)}(s_i^{(k)})$ | Sampled I Channel |
| $m'_i{}^{(k)}(s_i^{(k)})$ | Sampled Q Channel |
| $G_{i,}^{(k)}$ | Target Spectral Signature Element |
| $H_l^{(k)}$ | Synthetic Range Profile Element |
| $f_i^{(k)}$ | Frequency of Step |

FIG. 7

| Symbol | Description |
|---|---|
| $A_i^{(k)}$ | Amplitude of mixer output at frequency $i$ for burst k |
| $A_r$ | Radar receiving system antenna aperture |
| $(A/\phi)_i^{(k)}$ | Amplitude and phase of sample from the $i^{th}$ frequency step of the $k^{th}$ burst |
| $(A/\phi)'_i^{(k)}$ | Amplitude and phase in the $l^{th}$ range cell of the synthetic range profile produced by the $k^{th}$ burst of a stepped-frequency waveform |
| $B_i, B_i'$ | Amplitudes of the received signal at frequency $i$ |
| $D$ | Dispersion factor |
| $E$ | Received signal energy |
| $F$ | Radar system noise factor |
| $G$ | Gain |
| $G_i$ | Sampled output at frequency step $i$ |
| $G_{i,}^{(k)}$ | Sampled output at frequency $i$ for burst $k$ |
| $G_t$ | Transmitter antenna gain |
| $G_r$ | Receiver antenna gain |
| $H_l$ | Synthetic range profile response at range increment $l$ |
| $H_l^{(k)}$ | Synthetic range profile response at range increment $l$ of burst $k$ |
| $S_i$ | Sampling time of frequency step $i$ |
| $S_{i,}^{(k)}$ | Sampling time of frequency step $i$ of burst $k$ |
| $T_1$ | Pulse width, duration of a waveform frequency segment |
| $T_2$ | Pulse repetition interval (PRI) |
| $BRI$ | Burst Repetition Interval |

FIG. 16

DISPERSIVE TARGET IDENTIFICATION

CROSS-REFERENCE TO RELATED APPLICATIONS

This application claims the benefit of U.S. Provisional Application No. 62/134,502, filed Mar. 17, 2015, entitled "Dispersive Target Identification," which is hereby incorporated by reference in its entirety.

BACKGROUND

There is a need for an apparatus and method to detect dispersive targets.

BRIEF DESCRIPTION OF THE SEVERAL VIEWS OF THE DRAWINGS

Example

Example

Example

Example

Example

Example

Example FIG. 7 is a table of symbols used in the block diagram of FIG. 6.

Example

Example

Example

Example

Example

Example

Example

Example

Example FIG. 16 is a table of symbols employed in this disclosure.

Example

DETAILED DESCRIPTION OF EMBODIMENTS

Some of the various embodiments of the present invention may be employed to detect dispersive targets.

Figure 1:
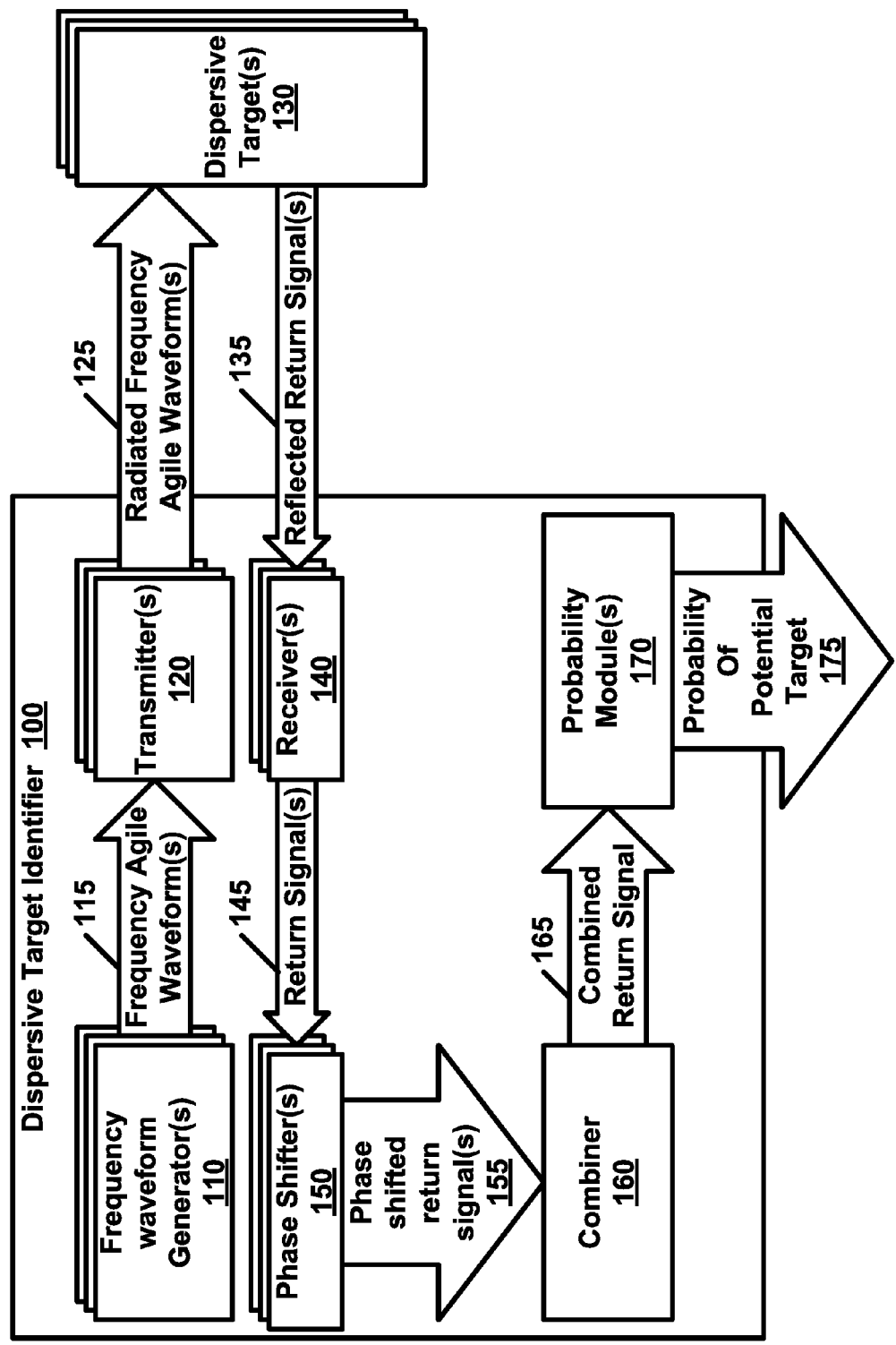
FIG. 1 is a block diagram illustrating various aspects of an embodiment of the present invention.

Example FIG. 1 is a block diagram illustrating aspect(s) of an embodiment of a dispersive target identification apparatus 100. As illustrated, the apparatus 100 may comprise at least one waveform generator 110, at least one transmitter 120, at least one receiver 140, at least one phase shifter 150, a combiner 160, and a probability module 170.

The waveform generator(s) 110 may be configured to form frequency agile signal waveform(s) 115. The frequency agile signal waveform(s) 115 may comprise at least a first frequency agile signal waveform and a second frequency agile signal waveform. The first frequency agile signal waveform may comprise a first bandwidth and a first multitude of frequency elements between a first lower frequency and a first upper frequency. Similarly, the second frequency agile signal waveform may comprise a second bandwidth and a second multitude of frequency elements between a second lower frequency and a second upper frequency. According to some of the various embodiments, the first bandwidth is substantially equal to the second bandwidth.

The second lower frequency and second upper frequency may be shifted from the first lower frequency and second upper frequency respectively by a first delta frequency. According to some of the various embodiments, the delta frequency may correlate to a cutoff frequency of a target of interest.

According to some of the various embodiments, the frequency agile signal waveform(s) 115 may combine the first frequency agile signal waveform and a second frequency agile signal waveform into a single waveform. According to alternative embodiments, the first frequency agile signal waveform and a second frequency agile signal waveform may be discrete waveforms.

According to some of the various embodiments, frequency agile signal waveform(s) 115 may comprise any number of, or combination of waveform(s) such as, but not limited to chirp signal waveform(s), step-chirp signal waveform(s), linear frequency modulated waveform(s), combinations thereof, and/or the like. According to some of the various embodiments, some or all of the frequency agile signal waveform(s) 115 may be phase aligned. For example, the first frequency agile signal waveform and second frequency agile signal waveform may be phase aligned.

The transmitter(s) 120 may be configured to transmit the frequency agile waveform(s) 115. A single transmitter 120 may be employed when the frequency agile signal waveform(s) 115 comprise a combination of the first frequency agile signal waveform and a second frequency agile signal waveform. Multiple transmitter(s) 120 may be employed when, for example, the frequency agile signal waveform(s) 115 comprise discrete waveforms. The transmitter may operate at frequencies near cutoff frequenc(ies) of potential dispersive target(s) 130 as discussed further herein. Multiple transmitter(s) 120 may also be employed, for example, when cutoff frequencies of multiple potential dispersive target(s) 130 make it convenient to employ separate transmitter(s) 120 configured to transmit frequency agile waveform(s) 115 at various frequency bands.

The receiver(s) 140 may be configured to receive reflected return signal(s) 135 from dispersive target(s) 130. The reflected return signal(s) 135 may comprise a first return signal and a second return signal. The first return signal may comprise a first in-phase component and a first quadrature phase component. Similarly, the second return signal may comprise a second in-phase component and a second quadrature phase component. According to some of the various embodiments, the reflected return signal(s) 135 may combine the first return signal and second return signal. According to alternative embodiments, the first return signal and second return signal may be discrete signals.

The receiver(s) 140 may be configured as a single receiver 140 or as multiple receiver(s) 140. Multiple receiver(s) 140 may be employed, for example, when cutoff frequencies of multiple potential dispersive target(s) 130 make it convenient to employ separate receiver(s) 140 configured to receive signals in various frequency bands.

Phase shifter(s) 150 may be configured to generate phase shifted return signal(s) 155 by phase shifting the return signal(s) 145 from receiver(s) 140. The return signal(s) 145 may comprise at least a first return signal associated with the first frequency agile waveform and a second return signal associated with the second frequency agile waveform. For example, phase shifter(s) 150 may generate a second phase shifted return signal by phase shifting the second return signal by the delta frequency.

Combiner 160 may be configured to generate a combined return signal 165 by combining the first return signal and the second phase shifted return signal.

Probability module 170 may be configured to determine a probability of a potential target 175 when the combined return signal 165 exceeds a threshold.

According to some of the various embodiments, the waveform generator(s) 110 may be further configured to form at least a third frequency agile signal waveform. The third frequency agile signal waveform may comprise a third bandwidth and a third multitude of frequency elements between a third lower frequency and a third upper frequency. The third lower frequency and third upper frequency may be shifted from the first lower frequency and first upper frequency respectively by a second delta frequency that is different than the first delta frequency. One or more of transmitter(s) 120 may be further configured to transmit the third frequency agile signal waveform. Similarly, one or more of the receiver(s) 140 may be further configured to receive a third return signal. The third return signal may comprise a third in-phase component and a third quadrature phase component. One or more of the phase shifter(s) 150 may be further configured to generate a third phase shifted return signal by phase shifting the third return signal by the second delta frequency. The combiner 160 may be further configured to combine the third phase shifter return signal into the combined return signal 165.

According to some of the various embodiments, at least one waveform generator(s) 110 may be further configured to form additional frequency agile signal waveform(s) 115. At least one of the additional frequency agile signal waveform(s) 115 may comprise an additional bandwidth and an additional multitude of frequency elements between an additional lower frequency and an additional upper frequency. Each of the additional lower frequenc(ies) and additional upper frequenc(ies) may be shifted from the first lower frequency and first upper frequency respectively by a different additional delta frequency that is different than the first delta frequency, the second delta frequency and another additional delta frequenc(ies).

At least one of the transmitter(s) 120 may be further configured to transmit at least one of the additional frequency agile signal waveform(s) 125. At least one of the receiver(s) may be further configured to receive at least one additional return signal. Each of the at least one additional return signal may comprise an additional in-phase component and an additional quadrature phase component.

At least one of the phase shifter(s) 150 may be further configured to generate an additional phase shifted return signal for each of the additional return signal(s) 145 by phase shifting the additional return signal by the additional delta frequency. The combiner 160 may be further configured to combine additional phase shifter return signal(s) into the combined return signal 165.

Figure 2:
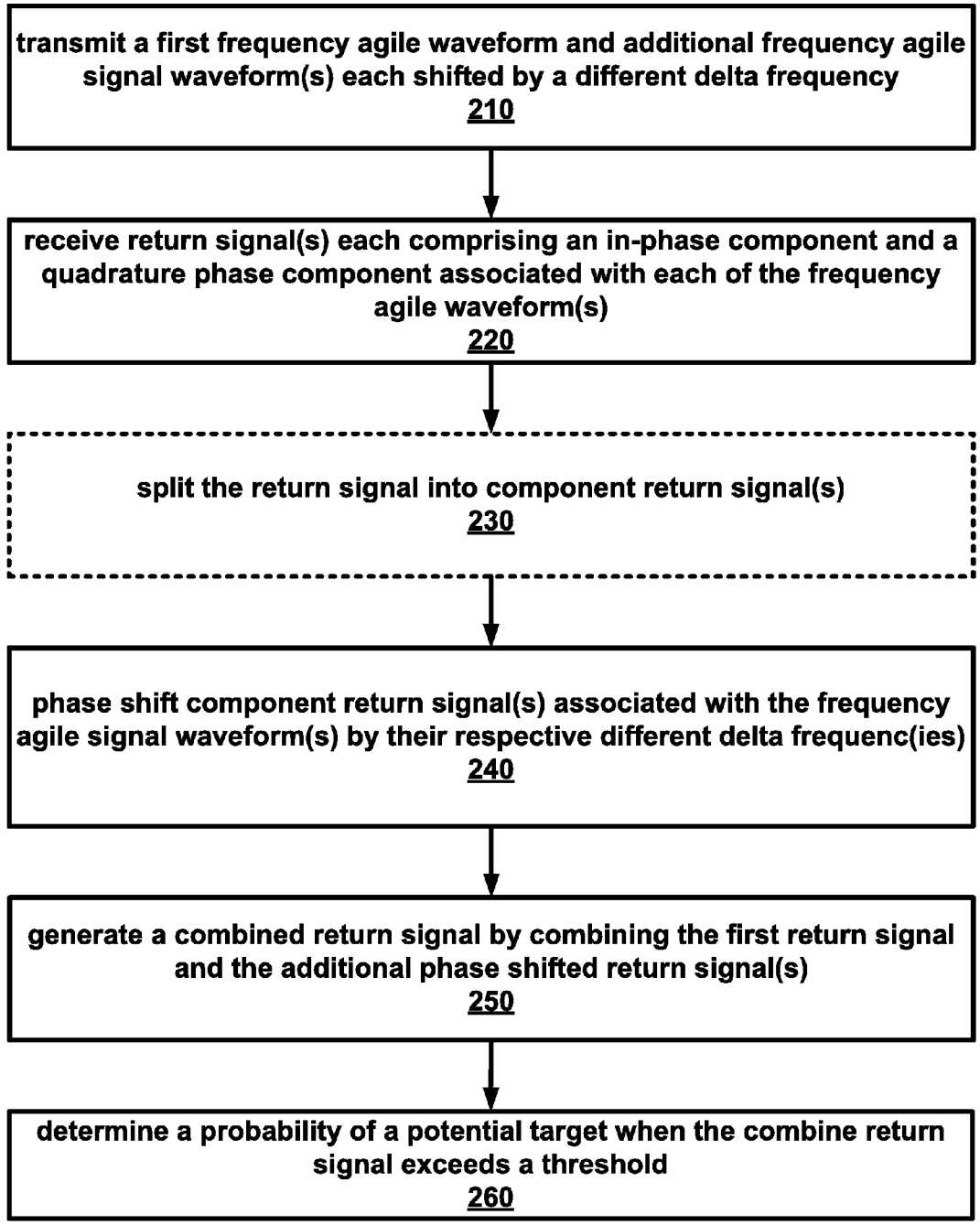
FIG. 2 is a flow diagram illustrating various aspects of an embodiment of the present invention.

Example FIG. 2 is a flow diagram illustrating an aspect of an embodiment of the present invention. A first frequency agile waveform, a second frequency agile signal waveform and optionally a third frequency agile signal waveform(s) and/or additional frequency agile signal waveform(s) may be transmitted at 210. According to some embodiments, the direction of the transmission may be towards a possible location of a dispersive target.

The first frequency agile signal waveform may comprise a first bandwidth and a first multitude of frequency elements between a first lower frequency and a first upper frequency. The second frequency agile signal waveform may comprise a second bandwidth and a second multitude of frequency elements between a second lower frequency and a second upper frequency. The second lower frequency and second upper frequency may be shifted from the first lower frequency and first upper frequency respectively by a first delta frequency. The third frequency agile signal waveform may comprise a third bandwidth and a third multitude of frequency elements between a third lower frequency; and a third upper frequency. The third lower frequency and third upper frequency may be shifted from the first lower frequency and first upper frequency respectively by a second delta frequency that is different than the first delta frequency. The additional frequency agile signal waveform(s) may each comprise an additional bandwidth and an additional multitude of frequency elements between an additional third lower frequency and an additional upper frequency. Each of the additional lower frequency and additional upper frequency may be shifted from the first lower frequency and first upper frequency respectively by a different additional delta frequency that is different than the first delta frequency, the second delta frequency, and another additional delta frequency. In other words, each additional frequency agile signal waveform(s) may be shifted by a different delta frequency.

Return signal(s) may be received at 220. According to some of the various embodiments, the return signal(s) may be combined. According to some other of the various embodiments, the return signal(s) may be separate return signal(s). In yet other embodiments, the return signal(s) may be a combination of combined and separate return signal(s).

Return signal(s) may comprise a first return signal, a second return signal, combined and/or separate. Optionally, according to some of the various embodiments, return signal(s) may also comprise third return signal and/or additional return signal(s). The first return signal may comprise a first in-phase component and a first quadrature phase component. The second return signal may comprise a second in-phase component and a second quadrature phase component. The third return signal may comprise a third in-phase component and third quadrature phase component. Additional return signal(s) may each comprise an additional in-phase component and an additional quadrature phase component.

In the case that some or all of the return signal(s) are combined, the component return signal(s) (e.g. first return signal, second return signal, third return signal and/or additional return signals) may be split from combined return signal(s) at 230.

Each of the component return signal(s) may be phase shifted by their respective different delta frequency at 240. For example, a second phase shifted return signal may be generated by phase shifting the second return signal by the delta frequency. In another example embodiment, a third phase shifted return signal may be generated by phase shifting the third return signal by the second delta frequency. In yet another example embodiment, additional phase shifted return signal(s) may be generated for each of the additional return signal(s) by phase shifting the additional return signal(s) by additional delta frequenc(ies).

At 250, a combined return signal may be generated by combining the first phase shifted return signal, the second phase shifted return signal and optionally the third phase shifted return signal and/or additional phase shifted return signal(s).

At 260, a probability of a potential target may be determined when the combined return signal exceeds a threshold. A threshold may comprise, for example, at least one adaptive threshold, at least one predetermined threshold, a combination thereof, and/or the like. An adaptive threshold may change over time based upon changing conditions and/or requirements. Additionally, the threshold may adapt to various measurement configurations, sensors, sensor placements, signal processors, combinations thereof, and/or the like.

The threshold may include at least one value. The value may be predetermined or dynamically determined. Dynamically determined threshold(s) may be based on statistic(s). The threshold may also include a multi-variable function. James & James, *Mathematics Dictionary*, 1966 defines: "A function of one variable is a function which has only one independent variable." "A function of several variables [multi-variable] is a function which takes on a value or values corresponding to every set of values of several variables (called the independent variables)."

Figure 3:
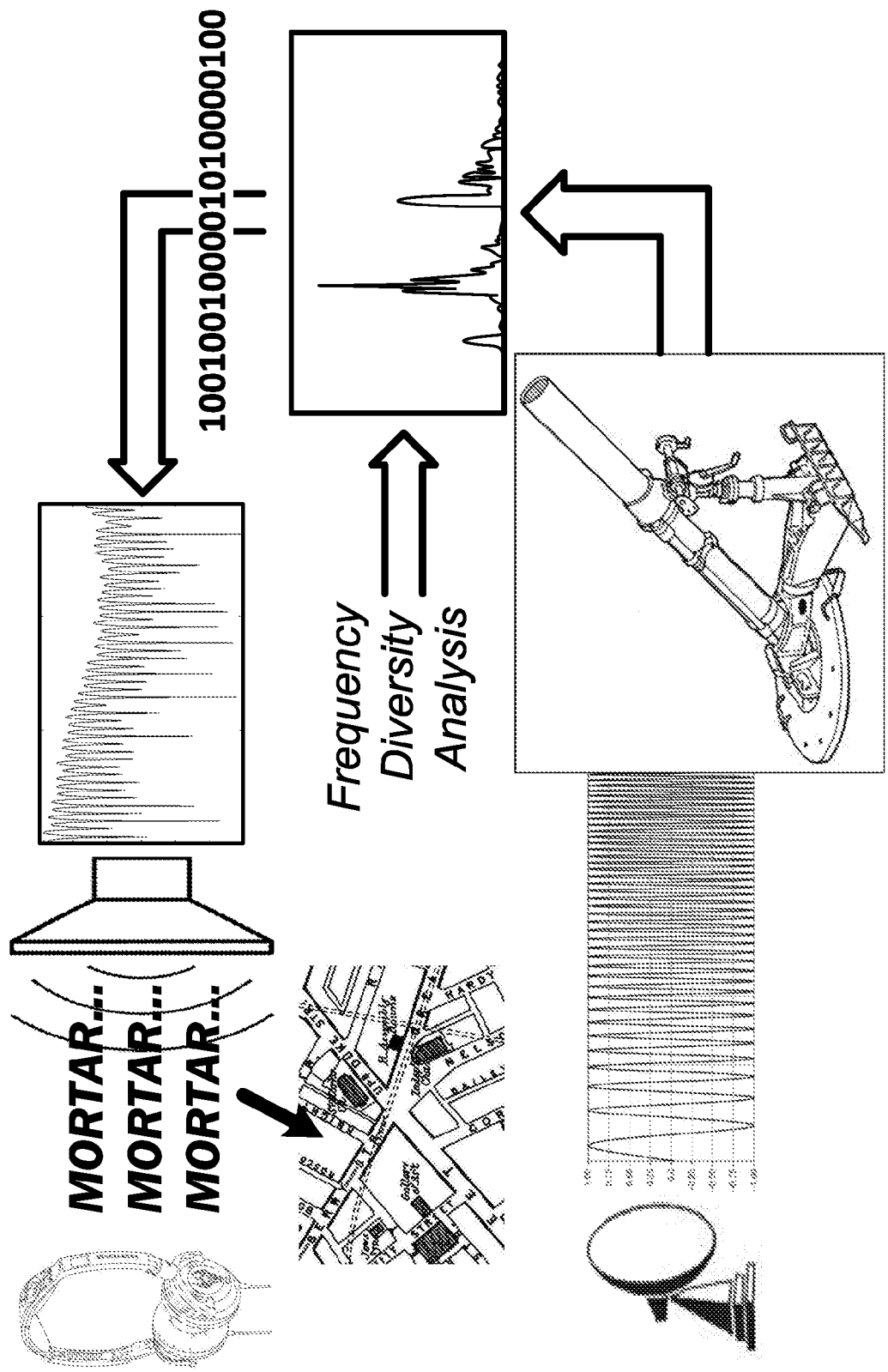
FIG. 3 is an illustration of embodiment of the present invention employed to detect a mortar.

FIG. 3 is an illustration of embodiment of the present invention employed to detect a mortar. Some of the various embodiments, (sometimes referred to as Frequency Diversity (FD)) may be employed, for example, for pre-shot detection of indirect fire weapons. Embodiments may employ signal processing with a multi-frequency, wide-band radar to identify & locate indirect fire weapons. Some of the various embodiments may be configured to operate from various platforms such as, but not limited to: stationary platforms, mobile platforms, unmanned aerial vehicle (UAV) platforms, combinations thereof, and/or the like. Embodiments may be employed as part of Tactical Edge Analytics, Surveillance & Target Acquisition, Asymmetric and irregular warfare, combinations thereof, and/or the like.

Some of the various embodiments may be employed in systems configured to detect barreled weapons utilizing conventional radar and leading-edge signal processing algorithms, employing in some cases, Doppler effect analysis. A multi-frequency, wideband radar system may be employed which has, for example, a wide range from meters to multiple kilometers. Real time computational system(s) may be employed to implement FD, syntactic pattern recognition, and other processes based on output from a detection system and/or subsystem.

A signal return from a non-dispersive target at Range "R" may be described as $$s(t, R) = \cos[2\pi f_0(t - t_R)]$$

$$t_R = 2\frac{R}{c} = \text{Range in meters,}$$

c=speed of light, $f_0$ is transmitter frequency in hertz

A signal return from a dispersive target at range "R" may be described as:

$$s(t, R) = \cos[2\pi f_0(t - t_R)]$$

$$t_R = 2\frac{R}{c\sqrt{1 - (f_c/f_0)^2}}$$

$f_c$ is the cutoff frequency in hertz

Figure 4:
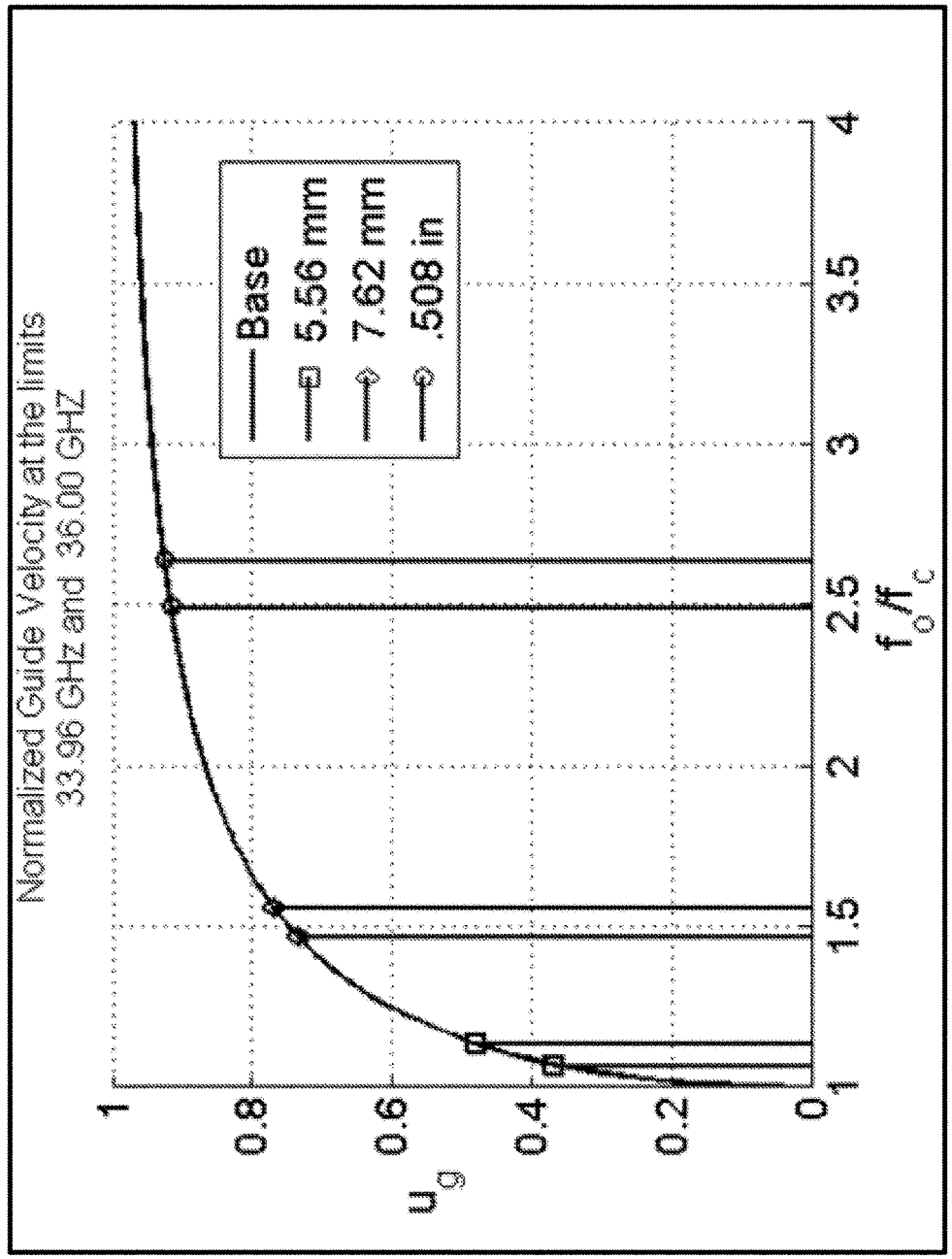
FIG. 4 is a plot showing normalized group velocity vs cutoff-to-transmission frequency ratio to illustrate various aspects of an embodiment of the present invention.

Thus the returns from a dispersive target may produce an apparent range shift that is a function of frequency while the return from a non-dispersive target may not. There are different ways in which this ambiguity may be induced. Recall that doppler may be induced either by a stationary radar combined with a moving target or a moving radar combined with a stationary target or where both are in motion. The last case may require some knowledge of the radar's velocity for it to be eliminated. Some of the various embodiments apply similar mechanisms to barrel identification in the presence of clutter by exploiting doppler induced by a moving ground target to discriminate between the moving target itself and stationary ground clutter FIG. 4 illustrates variation in the group velocity as a function of cutoff-to-transmission frequency ratio. The normalized group velocity may be the ratio of the group velocity to the speed of light and may be given by $u_g = \sqrt{1-(f_c/f_0)^2}$. Cutoff frequency (sometimes referred to as corner frequency or break frequency) is a boundary in a system's frequency response at which energy flowing through the system begins to be reduced (attenuated or reflected) rather than passing through.

Figure 6:
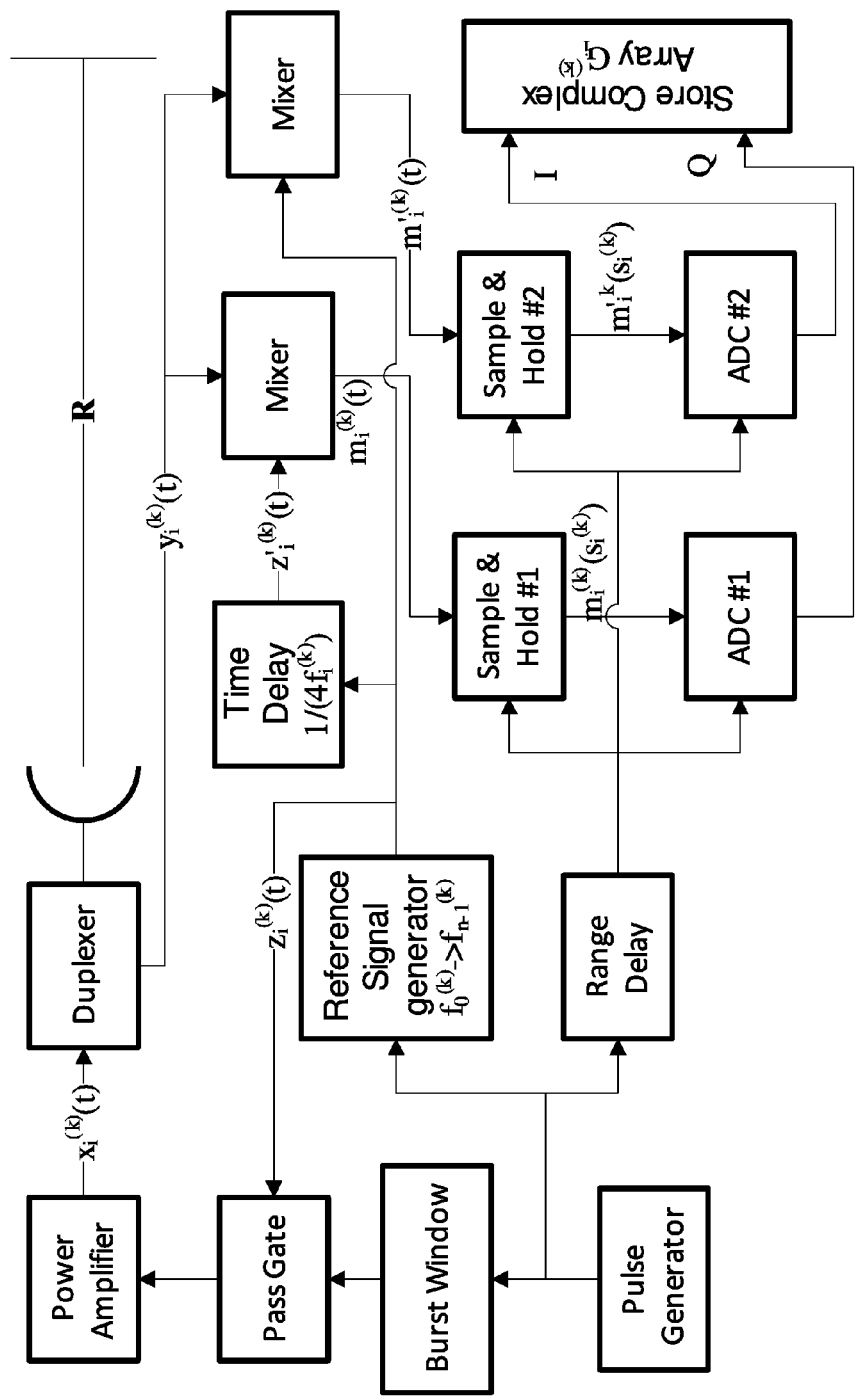
FIG. 6 is a block diagram of a stepped-frequency coherent radar model that may be employed by various aspects of an embodiment of the present invention.

Note that this effect may be most pronounced at frequencies close to the cutoff and becomes less a factor as the transmission frequency increases above the cutoff. It is this non-linearity that will be exploited to suppress the effects of the clutter. Moreover, FIG. 6 illustrates the diminished exploitability of this technique when a Ka band signal is used to irradiate a 0.50 cal barrel.

Pulse compression techniques employ frequency diversity techniques such as linear frequency modulation (LFM) combined with correlation processing to increase resolution. These techniques may result in a range-doppler. The applicability here is the employment of Moving Target Indicator (MTI) techniques to a stationary, as opposed to a moving target for clutter rejection.

Much attention has been given to the dispersive nature of waveguide as applied to single mode fiber optic communications. Often the limiting factor between the placement of repeaters is the dispersion within the fiber. The dispersion within the fiber may be quantified in terms of picosecond-delay-per kilometer of fiber length. This may limit the pulse rate that can be achieved for any given fiber length. In fact, a fiber may have a figure of merit that is the pulse-rate-distance factor analogous to the gain-bandwidth product of a transistor amplifier.

Figure 5:
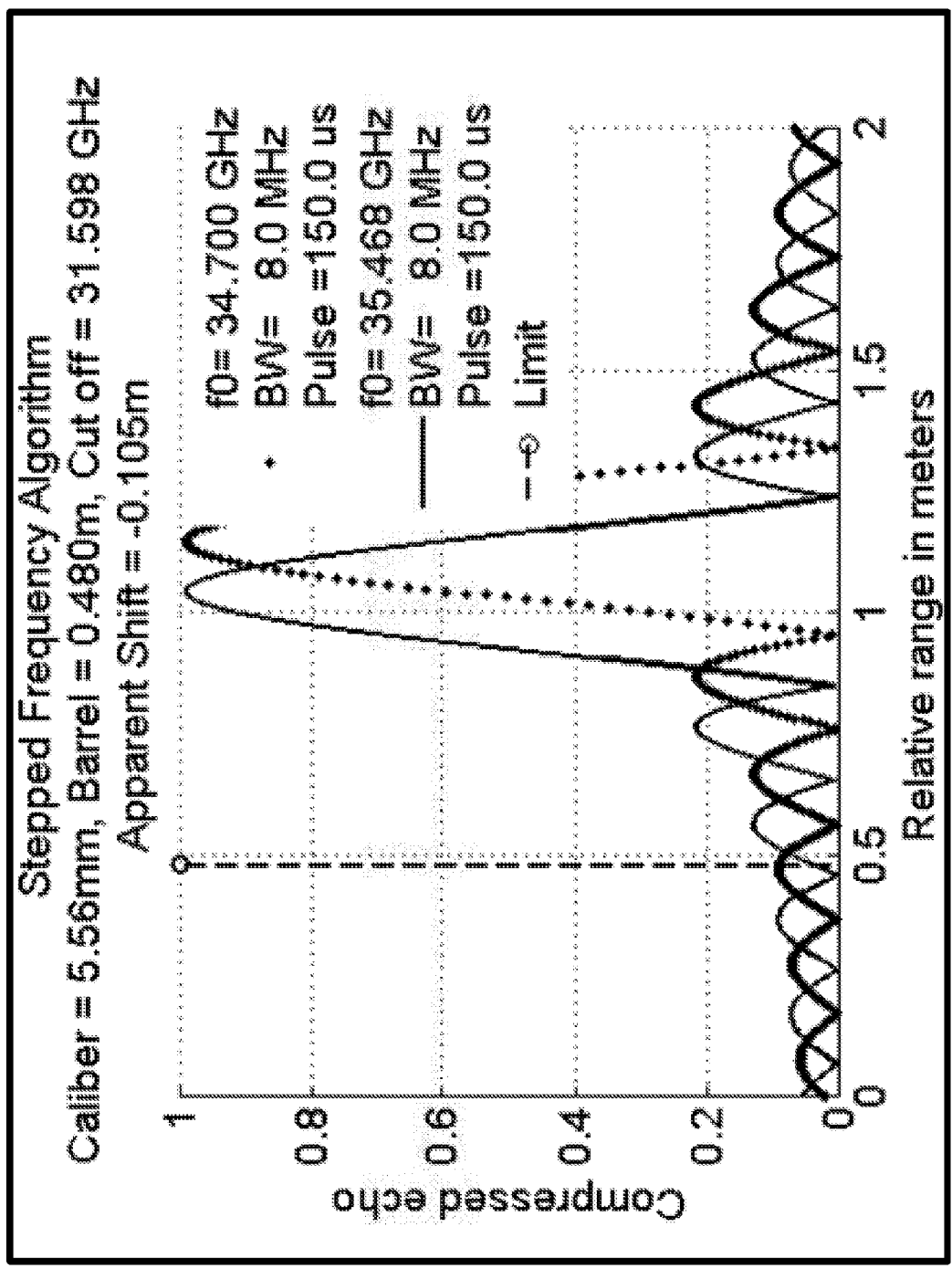
FIG. 5 is a plot of radar returns from two consecutive pulses 768 MHz apart employed to illustrate various aspects of an embodiment of the present invention.

FIG. 5 illustrates processed returns from an LFM radar consisting of two consecutive pulses separated by 768 MHz. As can be seen, there is an apparent shift of 0.105 meters between the two returns. This small shift may be due to the fact that the transmission frequency is a little over 3 GHz above the cutoff. In practice, frequencies may be chosen to be closer to a cutoff resulting in a larger shift. As illustrated in FIG. 5, the apparent displacement of the return with increasing frequency may continue to shift left until it reaches a limit of 0.488 m represented by the dashed vertical line.

We will now discuss some of the various embodiments as they may be applied to the application of a coherent stepped-frequency radar to the task of detecting and identifying the modulation produced by the illumination of a rifle barrel and the example specification parameters of such a radar. A stepped-frequency radar is being disclosed as one of multiple possible example radars that may generate a frequency diverse signal.

A proposed block diagram for a radar transceiver up to the acquired I & Q data that may be forwarded to a signal processor. The signal processor may employ, among other mechanisms, Fourier processing of the I & Q data to recover CIM data. Additional processing may be employed to cancel the effects of clutter in a low signal-to-clutter environment. A disclosed mathematical analysis of the signal processing chain describes one of the possible approaches. However it is important to note that the basic approach to the radar prior to the Fourier based signal processing may be independent of whether moving target approaches are employed.

Coherent Stepped Frequency Radar

Example FIG. 6 is a block diagram of a stepped-frequency coherent radar model that may be employed by some aspects of an embodiment of the present invention. Example FIG. 7 is a table of symbols used in the block diagram of FIG. 6.

The radar block diagram in FIG. 6 shows an example stepped frequency coherent system designed to be flexible in the key parameters necessary to discriminate a dispersive target whose detection may be a function of transmitted frequency. Furthermore, by transmitting a sequence of stepped frequency pulses, a stepped frequency coherent system may facilitate moving target indication techniques that may be applied to enhance clutter rejection.

Clutter returns within subsequent range gates may be stationary and may be cancelled using techniques applicable to some of the various embodiments. While inter-pulse clutter returns may be stationary if the frequency steps between radar pulses should display movement in time such that inter pulse return differencing should remove stationary returns and preserve frequency dependent returns from a dispersive reflector.

Operational Concept

A series of bursts of narrowband pulses may be transmitted, where each burst consists of n pulses stepped (shifted) in frequency from pulse to pulse by a fixed frequency step of $\Delta f$. A range-delayed sampling gate to collect I and Q samples of the target's baseband echo response for each transmitted pulse may be set. Quadrature components of each n echo signals from each transmitted pulse burst may be stored. Each echo burst of data may approach the equivalent of instantaneous discrete spectral signals of the target if burst times are short relative to target aspect change. An inverse discrete Fourier transform (IDFT) may be taken of the resulting n complex frequency components of each echo burst to obtain an n-element synthetic range profile signature of the target from each burst.

Figure 8:
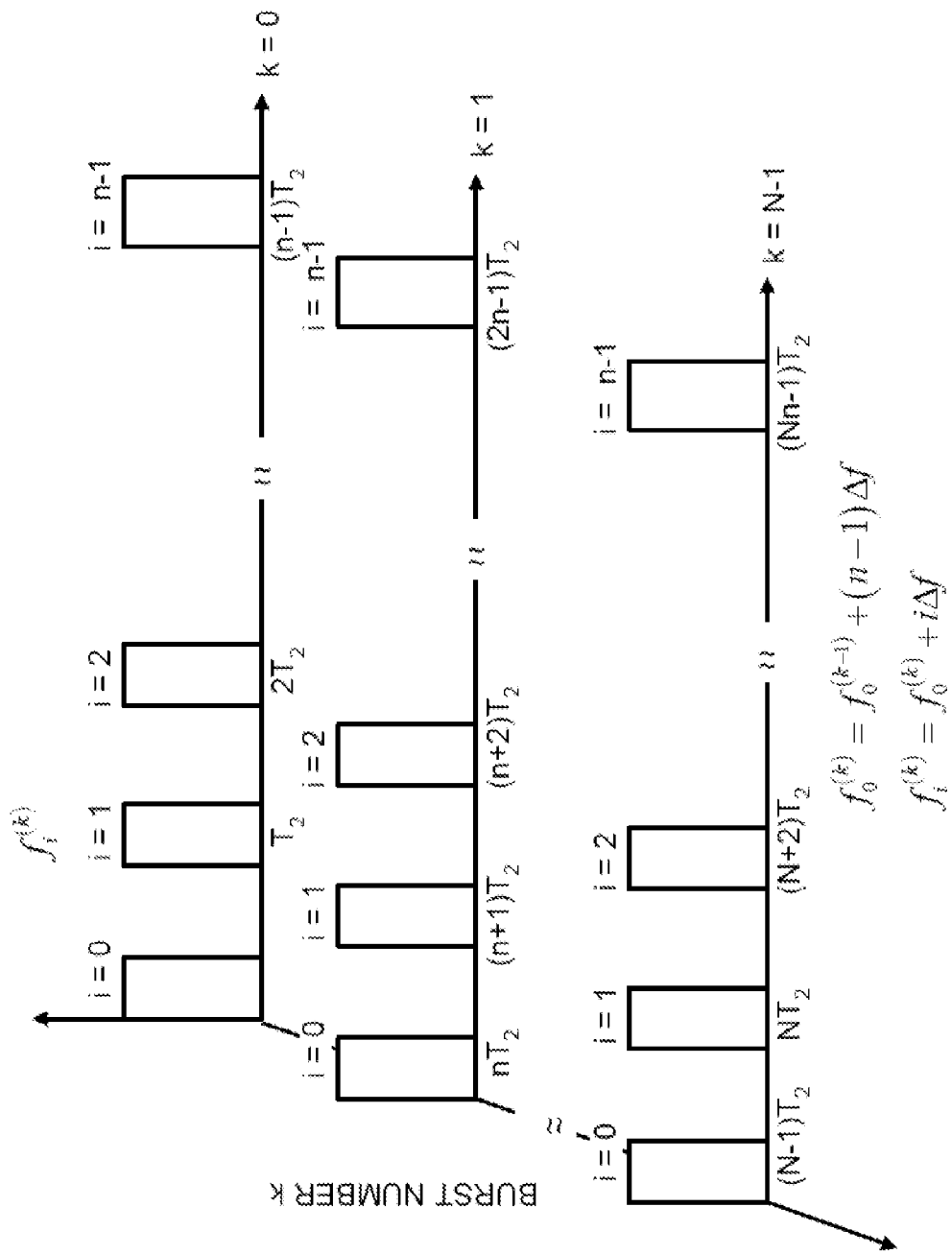
FIG. 8 illustrates a stepped-frequency radar burst signal plan according to various aspects of an embodiment of the present invention.

Example FIG. 8 illustrates a stepped-frequency radar burst signal plan according to some aspects of an embodiment of the present invention. FIG. 8 depicts a set of N bursts each of which begins at $f_0^{(k)}=f_0^{(k-1)}+\Delta nf$. While only one burst set of frequencies, in which N=1, may be required to identify the CIM; the additional burst sequences provide the clutter cancellation capability via MTI techniques due to the dispersive nature of the rifle barrel.

Additionally, the stepped-frequency waveform may remove the requirements for both a wide instantaneous bandwidth and a high sample rate by sampling near steady state reflectivity versus frequency of the illuminated target. However, the target may be considered to be a frequency-dispersive high-pass filter which is not, strictly speaking, a steady state reflective target. The implications of this assumption will be addressed in what follows.

Analysis for a Basic Embodiment

A real signal $s_r(t)$ may be defined to be a narrowband signal if its Fourier components $S_r(f)$ are confined to a bandwidth W that is small compared to its center frequency $f_0$. Thus a pulse signal $s(t)=rect(t/T_1)\cos(2\pi f_0 t)$ where $T_1=20$ ns and $f_0=35$ GHz may be considered a narrowband signal since $1/T_1 \ll f_0$.

A single stationary target whose reflectivity is constant with frequency f with a fixed reflectivity (independent of frequency) may extend the analysis to a stationery target $x_i^{(k)}(t)=B_i^{(k)}\cos(2\pi f_i^{(k)}t+\theta_i^{(k)})$ $iT_2 < t \le iT_2+T_1$. The received signal may be given by $$y_i^{(k)}(t)=B'_i \cos(2\pi f_i^{(k)}[t+\tau(t)]+\theta_i^{(k)})$$

for $iT_2+2(t)<t<iT_2+T_1+\tau(t)$ where $B'_i$ is the echo amplitude at frequency step i and $$\tau(t) = 2\frac{R - v_t t}{c}$$

$v_t$ is the target radial velocity and R is the target range

The target may be a stationary dispersive high pass filter and assuming a narrowband pulse such that the group velocity is constant within the pulse width interval so that $$\frac{v_t t}{c} = \frac{2L}{c\sqrt{1 - \left(\frac{f_c}{f_i^{(k)}}\right)^2}}$$

where

L is the tube length $f_c$ is the cutoff frequency and $f_i^{(k)}$ is the frequency for step i within burst k Thus $$\tau(t) \to \tau_i = \frac{2R}{c} + \frac{2L}{c\sqrt{1 - (f_c/f_i^{(k)})^2}}$$

where $f_c$ is the cut off frequency

Each input to the mixer may be a delayed version of the transmitted pulse as expressed $$z_i^{(t)} = B \cos(2\pi f_i^{(k)} + \theta_i^{(k)}), iT_2 < t \leq (i+1)T_2$$

assuming B constant

The resulting output for each baseband mixer may be for each frequency at step i is $$m_i^{(k)}(t) = \begin{cases} A_i^{(k)} \cos(-2\pi f_i^{(k)} \tau_i^{(k)} + \theta_i) iT_2 + \tau_i^{(k)} \leq t < iT_2 + T_1 + \tau_i^{(k)} \\ 0 \quad \text{Otherwise} \end{cases}$$

$A_i^{(k)}$ is the amplitude of the mixer output at frequency step i within burst k The phase of the mixer output may be:

$$\psi_i^{(k)}(t) = -2\pi f_i^{(k)} \tau_i^{(k)}$$

$$= -2\pi f_i^{(k)} \left[ \frac{2R}{c} + \frac{2L}{c\sqrt{1 - (f_c/f_i^{(k)})^2}} \right]$$

The mixers may be sampled at times t-Si, where Si is constantly advanced to produce a sample at the center of each echo pulse. This may be accomplished by setting the sampling time as follows $$S_i = iT_2 + \frac{T_1}{2} + \frac{2R}{c}$$

The sampled output from one mixer may be:

$$m_i^{(k)} = A_i^{(k)} \cos \psi_i^{(k)}$$

$$G_i^{(k)} = A_i^{(k)} [\cos \psi_i^{(k)} + j \sin \psi_i^{(k)}]$$

in complex form $$G_i^{(k)} = A_i^{(k)} \psi_i^{(k)}$$

$$\Rightarrow \psi_i^{(k)} = -2\pi f_i^{(k)} \left[ \frac{2R}{c} + \frac{2L}{c\sqrt{1 - (f_c/f_i^{(k)})^2}} \right]$$

The sampled quadrature mixer output signals Gi for each transmitted burst may be samples of the target reflectivity in the frequency domain. The n complex samples in each burst may be transformed by IDFT to a series of range delay reflectivity estimates $H_l$ $$H_l^{(k)} = \frac{1}{n} \sum_{i=0}^{n-1} G_i^{(k)} e^{j(2\pi/n)li}$$

$$= \frac{1}{n} \sum_{i=0}^{n-1} A_i^{(k)} e^{j\psi_i^{(k)}} e^{j(2\pi/n)li}$$

The underlying details are shown in:

$$H_l^{(k)} \cong \frac{1}{n} \sum_{i=0}^{n-1} A \exp(j\psi_i^{(k)}) \exp\left(j2\pi \frac{il}{n}\right)$$

$$= \frac{1}{n} \sum_{i=0}^{n-1} A \exp\left(-j4\pi f_i^{(k)} \frac{R+L}{c}\right) \exp\left(j2\pi \frac{il}{n}\right)$$

$$f_i^{(k)} = f_0^{(k)} + i\Delta f$$

$$H_l^{(k)} \cong \frac{A}{n} \sum_{i=0}^{n-1} \exp\left(-j4\pi (f_0^{(k)} + i\Delta f) \frac{R+L}{c}\right) \exp\left(j2\pi \frac{il}{n}\right)$$

$$H_l^{(k)} \cong \frac{A}{n} \exp\left(-j4\pi (f_0^{(k)}) \frac{R+L}{c}\right) \sum_{i=0}^{n-1} \exp\left[j\frac{2\pi i}{n}\left(l - \frac{2n\Delta f(R+L)}{c}\right)\right]$$

$$H_l^{(k)} \cong \frac{1}{n} \sum_{i=0}^{n-1} A \exp(j\psi_i^{(k)}) \exp\left(j2\pi \frac{il}{n}\right)$$

$$= \frac{1}{n} \sum_{i=0}^{n-1} A \exp\left(-j4\pi f_i^{(k)} \frac{R+L}{c}\right) \exp\left(j2\pi \frac{il}{n}\right)$$

$$f_i^{(k)} = f_0^{(k)} + i\Delta f$$

$$H_l^{(k)} \cong \frac{A}{n} \sum_{i=0}^{n-1} \exp\left(-j4\pi (f_0^{(k)} + i\Delta f) \frac{R+L}{c}\right) \exp\left(j2\pi \frac{il}{n}\right)$$

$$H_l^{(k)} \cong \frac{A}{n} \exp\left(-j4\pi (f_0^{(k)}) \frac{R+L}{c}\right) \sum_{i=0}^{n-1} \exp\left[j\frac{2\pi i}{n}\left(l - \frac{2n\Delta f(R+L)}{c}\right)\right]$$

Basic Coherent Stepped-Frequency Radar Signal Processing

Figure 9:
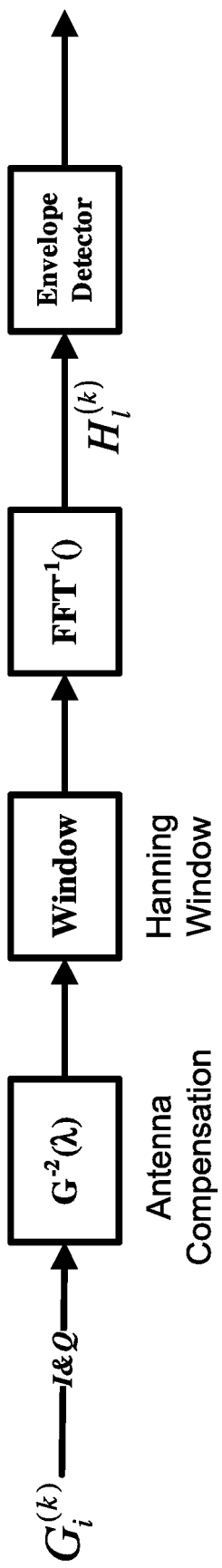
FIG. 9 illustrates example basic processing of I & Q data produced by the system shown in FIG. 4.

FIG. 9 illustrates example basic processing of I & Q data produced by the system shown in FIG. 6. This processing sequence may extract the Cavity Induced Modulation from the barrel in a high signal-to-clutter environment. Moving Target-Indicator techniques that may separate the target from the clutter will be discussed infra.

Antenna gain compensation may be employed to reduce (or potentially eliminate) the effects of antenna gain versus bandwidth due to the wideband nature of the radar. Windowing may also be employed to reduce the sidelobes inherent in the inverse discrete Fourier transform.

Figure 10:
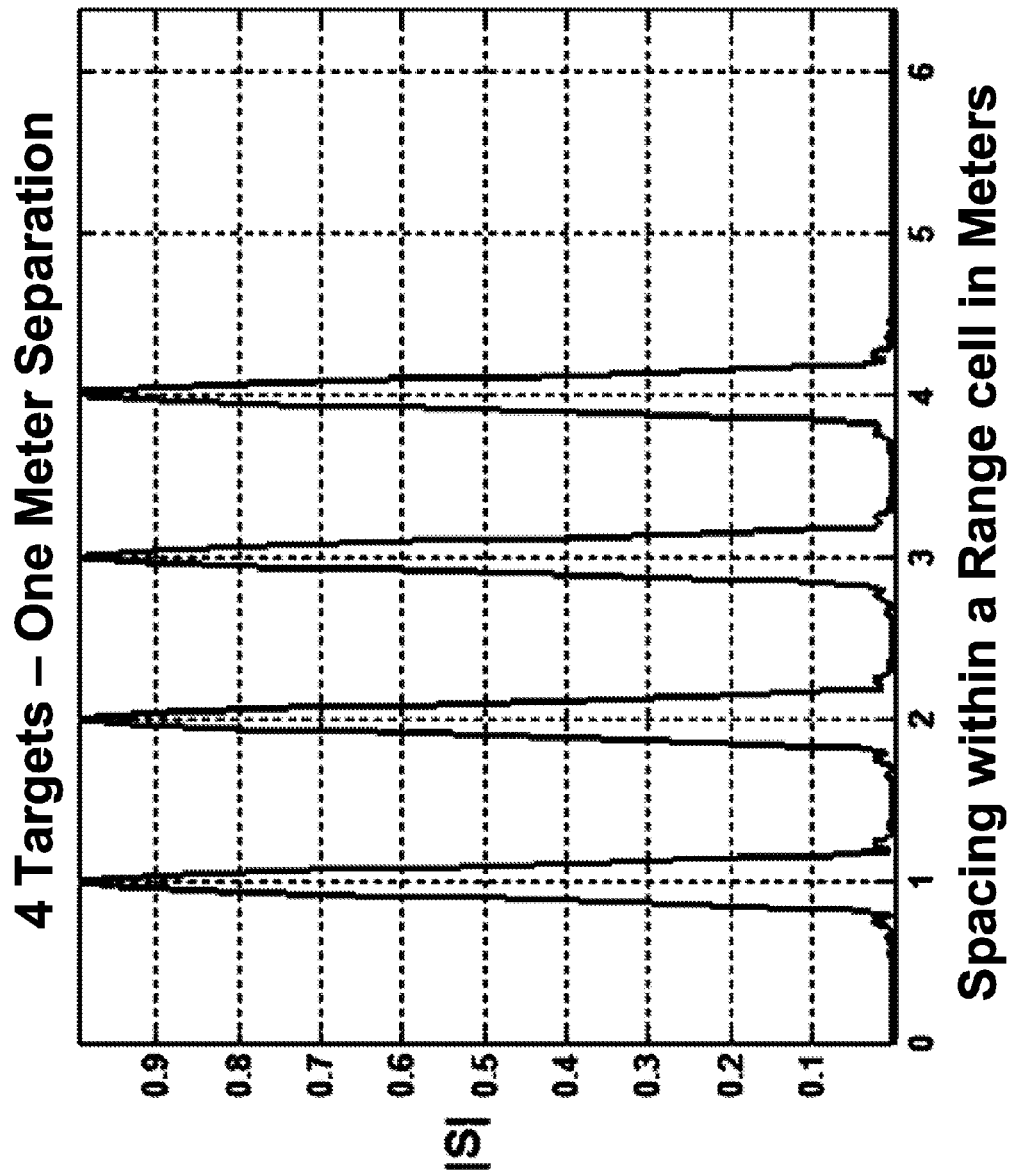
FIG. 10 illustrates Fourier transformed I & Q data for four idealized scatterers placed one meter apart within one range cell according to various aspects of an embodiment of the present invention.

FIG. 10 illustrates Fourier transformed I & Q data for four idealized scatterers placed one meter apart within one range cell. This data assumes a unity-gain antenna and a one square meter, frequency independent RCS. A Hanning widow prior to the FFT may be employed to reduce the side lobes inherent in DFT processing.

Application of Coherent Stepped-Frequency Radar Signal Processing to Dispersive Targets.

MTI radars may exploit the doppler shift difference between a moving target and the stationary clutter to improve the signal-to-clutter ratio. In our case, the target may be stationary, thus a motion induced doppler may be absent. However, the dispersive nature of the barrel may be exploited by inducing a "pseudo doppler" using, for example, a stepped frequency radar. This may be accomplished by illuminating the target with a series of frequency bursts whose corresponding processed returns are stored from one burst to another. By subtracting each return sequence from its previous return sequence, non-dispersive clutter may be suppressed.

Figure 11:
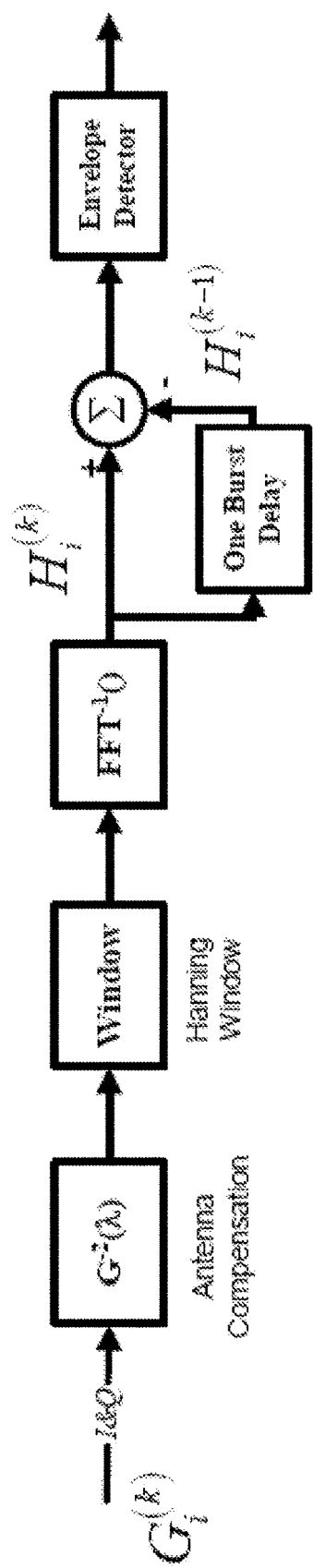
FIG. 11 is block diagram illustrating an additional processing mechanism employed to separate target return from that of clutter according to various aspects of an embodiment of the present invention.

FIG. 11 illustrates an example of an additional processing mechanism employed to separate target return from that of clutter. A sequence of frequency bursts may be employed to illuminate the target and clutter which are processed and then stored. Each processed burst-sequence $\{H_l^{(k)}\}$ may be differenced with the previous one $\{H_l^{(k-1)}\}$ and may serve as an input to an envelope detector.

The tube may comprise a cylindrical cavity which may possess a resonance characteristic that is a function of its length, thus the cavity induced modulation (CIM). CIM may be a wideband phenomenon that may manifest itself as a periodic function of the length of the cylinder and the frequency of excitation. Including the nonlinearities due to the dispersive nature of the tube we may have:

$$CIM_i = e^{-j2\pi f_i 2L/c\sqrt{1-(f_c/f_i)^2}}$$

for $f_i \square f_c$ $$CIM_i = e^{-j4\pi f_i L/c}$$

The effects of the dispersive nature of the cylindrical tube with respect to the frequency dependent delay have been included, but not those resulting in the distortion in the received pulse due to the spectral content of the pulse itself, which is reasonable for a narrowband radar. Nevertheless, in a later section this distortion in the pulse envelope will be addressed.

Figure 12:
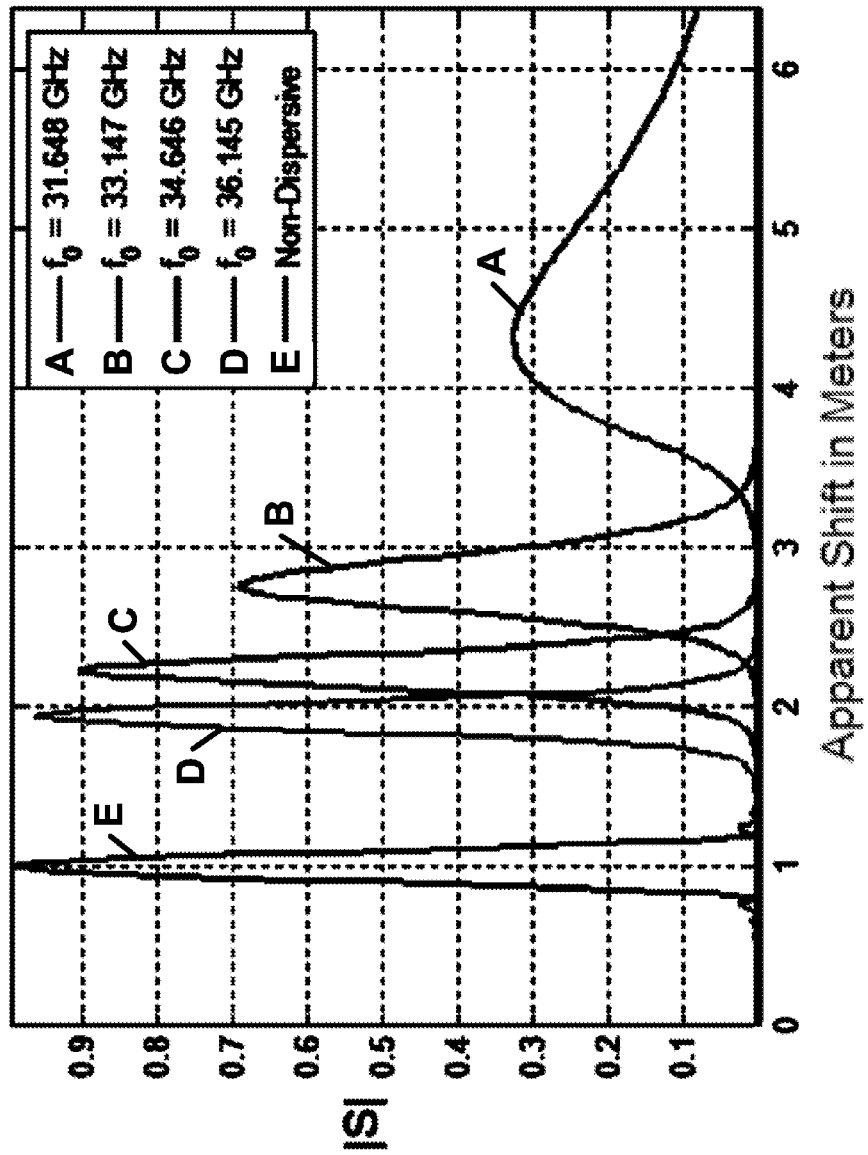
FIG. 12 is a plot illustrating the apparent shift from a non-dispersive target in response to a set of four frequency step sequences according to various aspects of an embodiment of the present invention.
Figure 13:
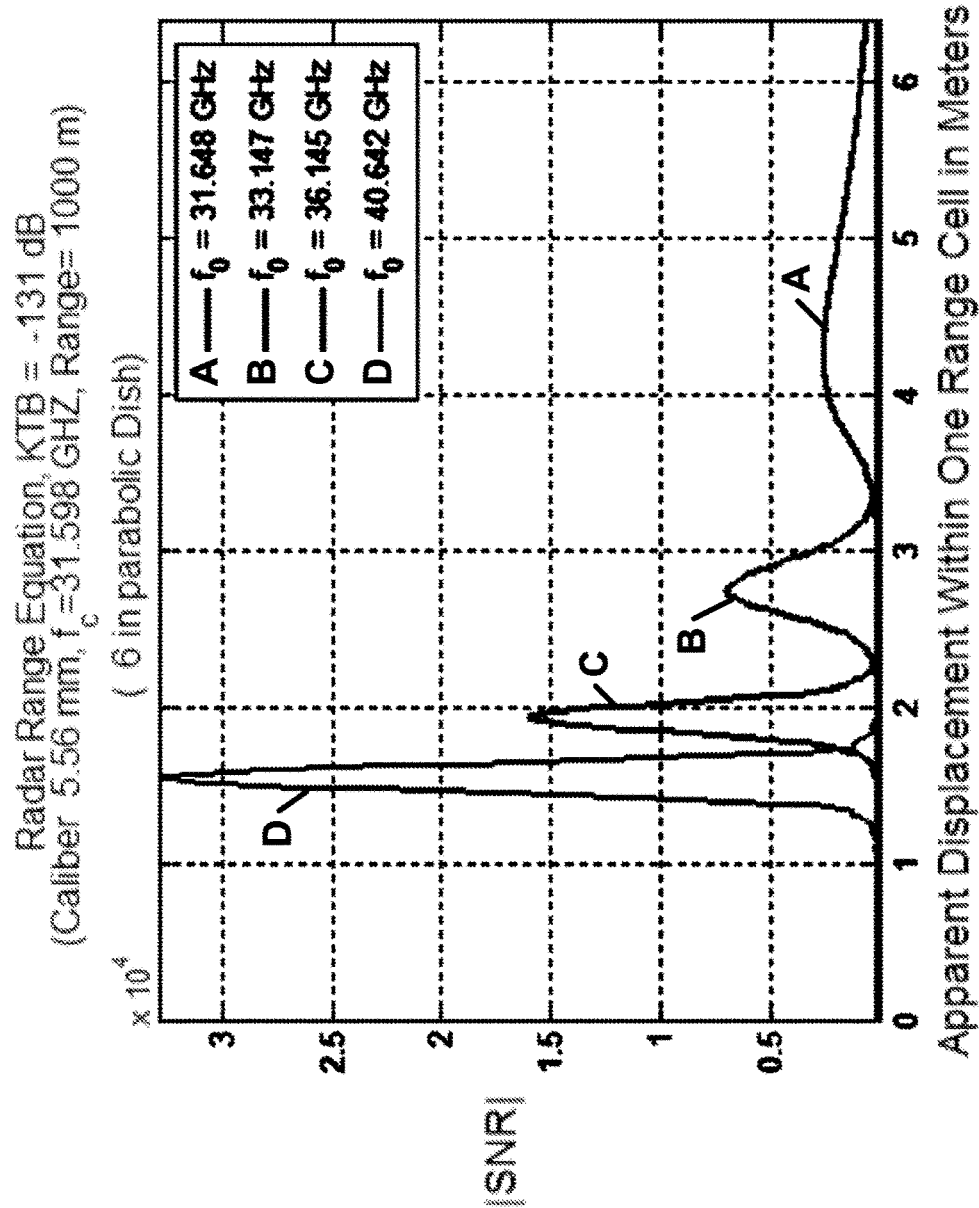
FIG. 13 is a plot illustrating the apparent displacement within one cell range according to various aspects of an embodiment of the present invention.

Additionally the above analysis assumes a coherent transmitter and does not include the effects of phase errors in the reference signal. Incorporating these effects produces:

FIG. 12 illustrates the response of a 5.56 mm cylinder to a set of four frequency step sequences each consisting of 256 steps at an increment of 5.88 MHz which corresponds to a 170 ns pulse. These parameters are the result of a range resolution of 0.1 m. The first step sequence begins at 50 MHz above the 5.56 mm cut off frequency of 31.598 GHz. This is repeated for three additional frequency bursts, each beginning with the final frequency of the previous sequence. Also shown is the response for a non-dispersive target such as a flat plate located at the same range serving to illustrate the limit as the exciting waveform frequency is far above the cut-off.

These results display two phenomena. First, there is an apparent shift of slightly over two meters from the lowest to the highest burst, and considerable pulse spreading is apparent for the first burst which is nearest the cut off frequency and farthest from the flat plate. Also apparent is the attenuation in the pulse peak as the burst start frequency is reduced. This is the result of the conservation of pulse energy as it travels through the barrel; the greater the pulse spread, the lower the peak value of the pulse.

These results may be idealized, serving to illustrate the applicability and feasibility of a stepped frequency radar to the detection of dispersive scatterers and as will be shown the ability to separate such scatterers from clutter.

Idealized Operation: Signal Only

Figure 14:
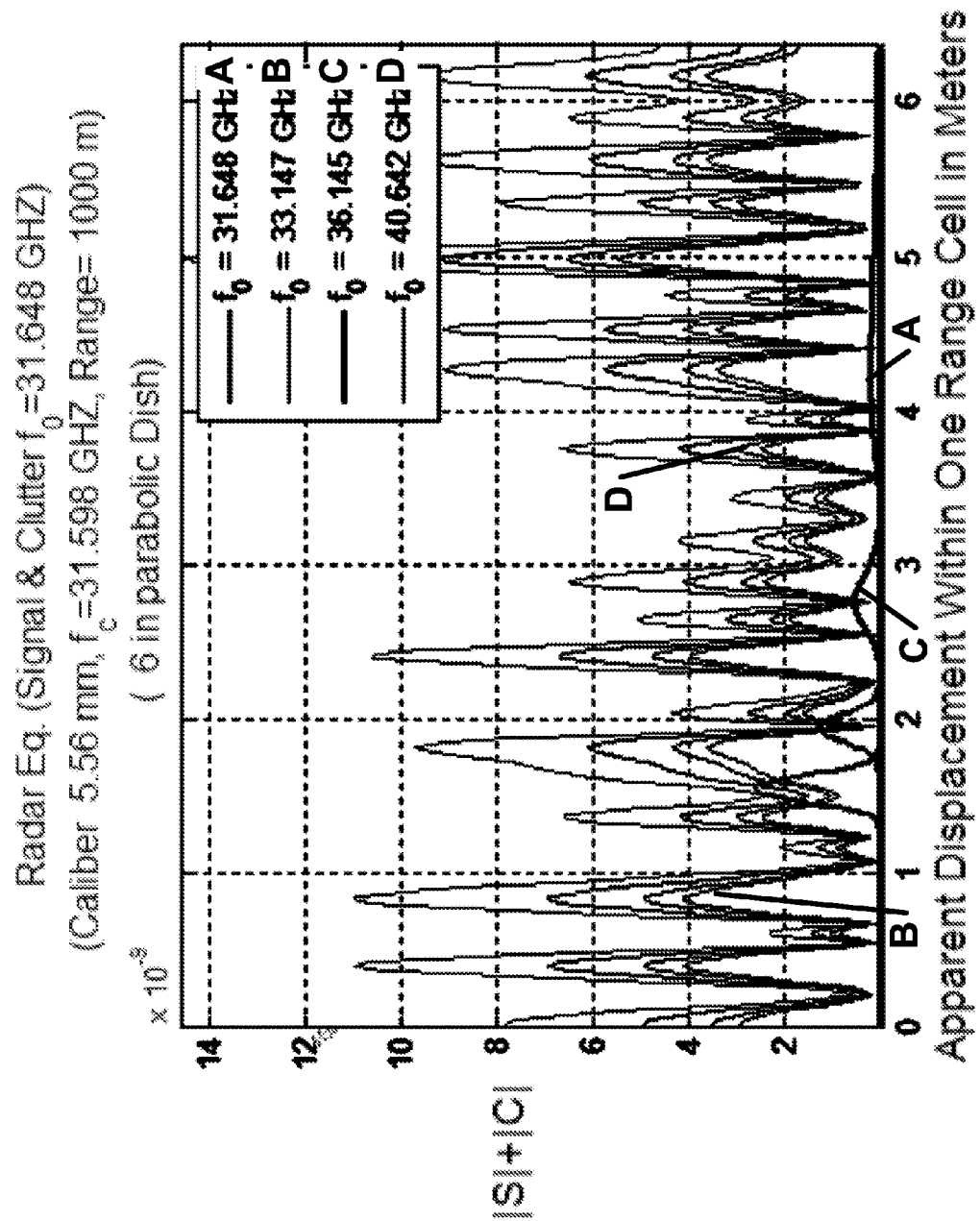
FIG. 14 illustrates a simulated performance of a stepped-frequency radar according to various aspects of an embodiment of the present invention.

FIG. 14 illustrates the simulated performance of a stepped-frequency radar against a 5.56 mm one-meter length barrel at 1000 meters using a 6 inch dish driven by a one watt power amplifier. The system noise temperature was assumed to be 10000 Kelvin and bandwidth of 5.88 MHz. The following equation illustrates the radar equation details applied to this figure and example. The SNR is quite high which is not surprising given the range and antenna gain used in this example. In fact, the SNR may not be the driving requirement, although important, as will be seen once the clutter is included.

$$S = \left(\frac{P_t G_t}{4\pi R^2}\right)\left(\frac{\sigma_t}{4\pi R^2}\right)(A_r)$$

$$A_r = A_t = \lambda^2\left(\frac{G_t}{4\pi}\right) \Rightarrow G_t = 4\pi\frac{A_t}{\lambda^2}$$

$$S = \left(\frac{P_t}{R^2}\frac{A_t}{\lambda^2}\right)\left(\frac{\sigma_t}{4\pi R^2}\right)(A_r)$$

$$S = P_t \sigma_t \frac{A_t^2}{4\pi\lambda^2 R^4}$$

$$N = kT_s B$$

$$S/N = P_t \sigma_t \frac{A_t^2}{4\pi\lambda^2 R^4 (kT_s B)}$$

Idealized Operation: Multiple Frequency Step-Sweep Clutter Cancellation

Figure 15:
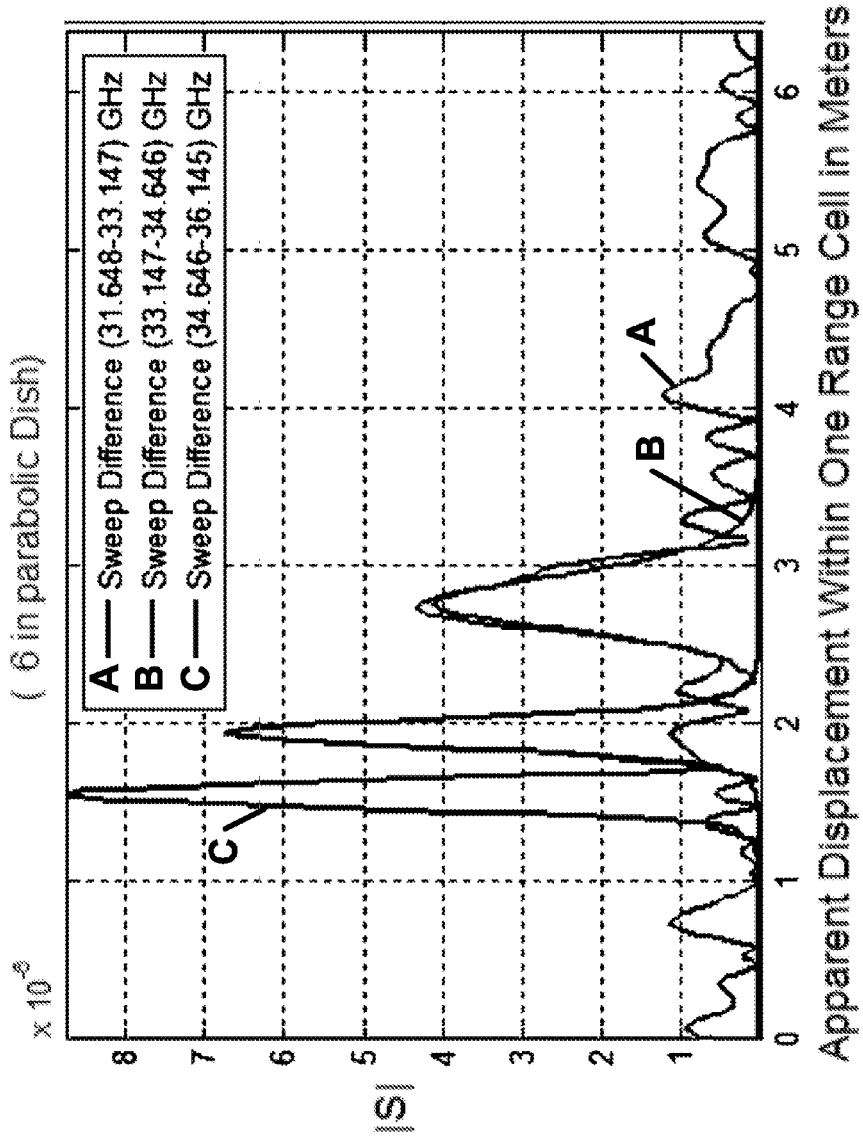
FIG. 15 illustrates utility derived from employing moving target indicator differencing techniques according to various aspects of an embodiment of the present invention.

FIG. 15 illustrates the utility derived from employing moving target indicator differencing techniques. These plots were derived by differencing sequential sweeps for four frequency ranges. Each subsequent sweep begins with the upper limit of the previous sweep.

Embodiments of the present invention use various radio frequency components, tools and processes known to those of ordinary skill in the art. For example, embodiments may be built for use in a lab and/or in an operational environment. Radio frequency processing may be performed employing custom circuitry, manufactured circuitry, test equipment, combinations thereof, and/or the like. For example, embodiments of the present invention may be implemented using commercial Network analyzers, signal processors, programmable hardware, combinations thereof, and/or the like. Examples of hardware that may be employed comprises, without limitation, network analyzers to source and receive RF signals. Two examples of such devices include: the N5222A PNA Series Network Analyzer, available from Keysight Technologies in Santa Rosa, Calif.; and the ZVA50 Network Analyzer, available from Rohde & Schwarz, USA in Columbia, Md. Many signal processing processes may be performed employing instructions executed by one or processors. Additionally, a combiner may be implemented using one or more processors programmed to perform a complex addition or subtraction. In another example, phase shifting may be implemented employing one or more processors programmed to, for example, shift a signal X inches in range using a step chirp of fqsteps (Freqstart base frequency and DeltaFreq increment) contained in the data arrays Idata and Qdata by:

Distance=X*0.0254//convert to meters
for (i=0; idqsteps; i++){
Freq=Freqstart+(i*DeltaFreq);
Lamda=0.2997925/Freq;
X=2.0*Distance/Lamda;
T=X-(int)X;
T=T*2.0*3.1419;
Cphase=Complex((float)cos(T),(float)sin(T));
Ival=Idata[i];
Qval=Qdata[i];
Ctemp=Cmult(Complex(Ival,Qval),Cphase);
Idata[i]=Ctemp.r;
Qdata[i]=Ctemp.i;}

Figure 17:
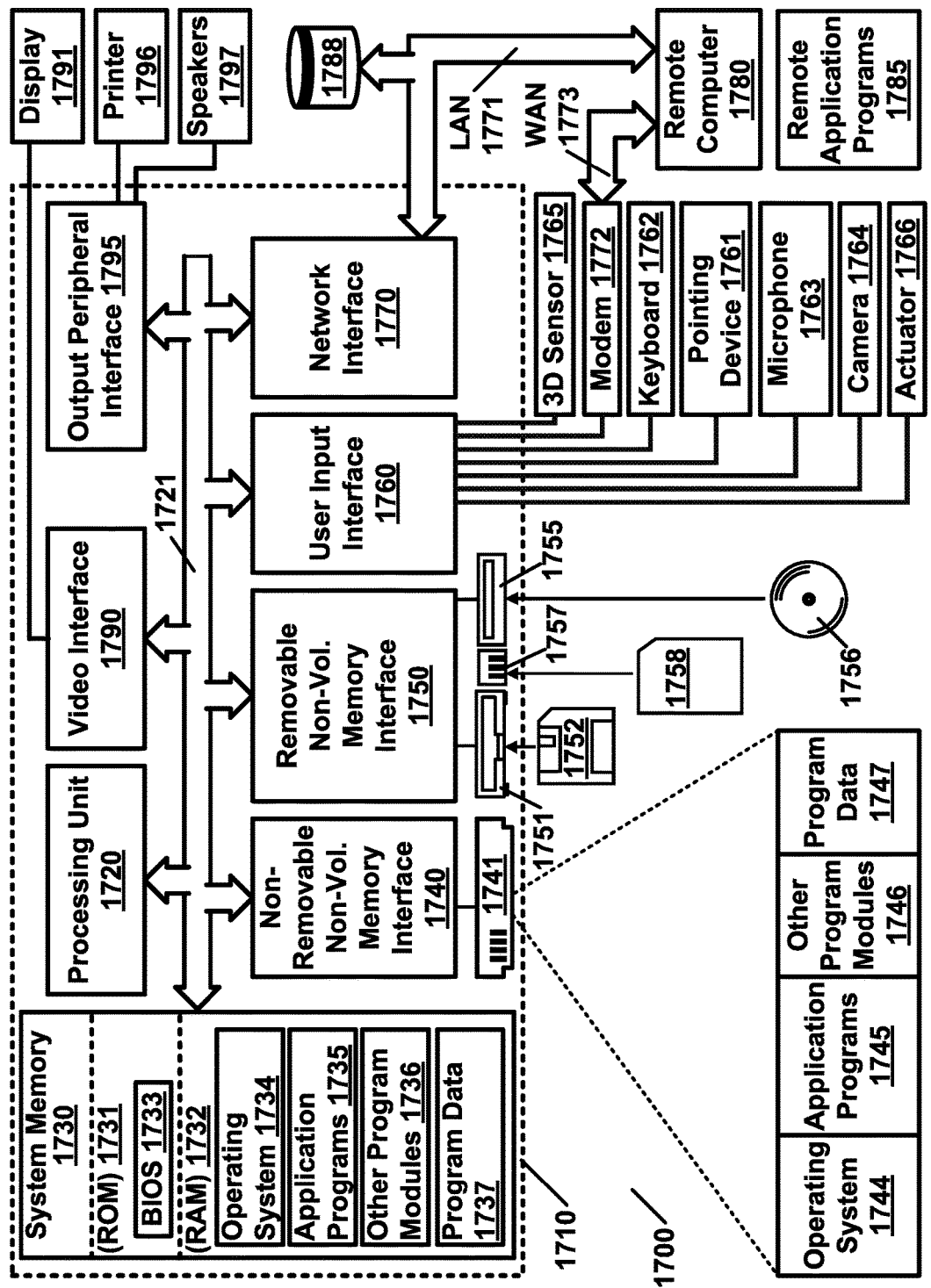
FIG. 17 is a block diagram illustrating a computing environment in which various aspects of embodiments of the present invention may be practiced.

FIG. 17 illustrates an example of a suitable computing system environment 1700 on which embodiments may be implemented. The computing system environment 1700 is only one example of a suitable computing environment and is not intended to suggest any limitation as to the scope of use or functionality of the claimed subject matter. Neither should the computing environment 1700 be interpreted as having any dependency or requirement relating to any one or combination of components illustrated in the exemplary operating environment 1700.

Embodiments are operational with numerous other general purpose or special purpose computing system environments or configurations. Examples of well-known computing systems, environments, and/or configurations that may be suitable for use with various embodiments include, but are not limited to, embedded computing systems, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 17, an example system for implementing some embodiments includes a general-purpose computing device in the form of a computer 1710. Components of computer 1710 may include, but are not limited to, a processing unit 1720, a system memory 1730, and a system bus 1721 that couples various system components including the system memory to the processing unit 1720.

Computer 1710 typically includes a variety of computer readable media. Computer readable media can be any available media that can be accessed by computer 1710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), electrically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by computer 1710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer readable media.

The system memory 1730 includes computer storage media in the form of volatile and/or nonvolatile memory such as ROM 1731 and RAM 1732. A basic input/output system 1733 (BIOS), containing the basic routines that help to transfer information between elements within computer 1710, such as during start-up, is typically stored in ROM 1731. RAM 1732 typically contains data and/or program modules that are immediately accessible to and/or presently being operated on by processing unit 1720. By way of example, and not limitation, FIG. 17 illustrates operating system 1734, application programs 1735, other program modules 1736, and program data 1737.

The computer 1710 may also include other removable/non-removable volatile/nonvolatile computer storage media. By way of example only, FIG. 17 illustrates a hard disk drive 1741 that reads from or writes to non-removable, nonvolatile magnetic media, a magnetic disk drive 1751 that reads from or writes to a removable, nonvolatile magnetic disk 1752, and an optical disk drive 1755 that reads from or writes to a removable, nonvolatile optical disk 1756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1741 is typically connected to the system bus 1721 through a non-removable memory interface such as interface 1740, and magnetic disk drive 1751 and optical disk drive 1755 are typically connected to the system bus 1721 by a removable memory interface, such as interface 1750.

The drives and their associated computer storage media discussed above and illustrated in FIG. 17, provide storage of computer readable instructions, data structures, program modules and other data for the computer 1710. In FIG. 17, for example, hard disk drive 1741 is illustrated as storing operating system 1744, application programs 1745, program data 1747, and other program modules 1746. Additionally, for example, non-volatile memory may include signal processing modules 380, threshold excedent determination processing module 390, combinations thereof, and/or the like.

A user may enter commands and information into the computer 1710 through input devices such as a keyboard 1762, a microphone 1763, and a pointing device 1761, such as a mouse, trackball or touch pad. These and other input devices are often connected to the processing unit 1720 through a user input interface 1760 that is coupled to the system bus, but may be connected by other interface and bus structures, such as a parallel port, game port or a universal serial bus (USB). A monitor 1791 or other type of display device may also connected to the system bus 1721 via an interface, such as a video interface 1790. Other devices, such as, for example, speakers 1797 and printer 1796 may be connected to the system via peripheral interface 1795.

The computer 1710 is operated in a networked environment using logical connections to one or more remote computers, such as a remote computer 1780. The remote computer 1780 may be a personal computer, a hand-held device, a server, a router, a network PC, a peer device or other common network node, and typically includes many or all of the elements described above relative to the computer 1710. The logical connections depicted in FIG. 17 include a local area network (LAN) 1771 and a wide area network (WAN) 1773, but may also include other networks. Such networking environments are commonplace in offices, enterprise-wide computer networks, intranets and the Internet.

When used in a LAN networking environment, the computer 1710 is connected to the LAN 1771 through a network interface or adapter 1770. When used in a WAN networking environment, the computer 1710 typically includes a modem 1772 or other means for establishing communications over the WAN 1773, such as the Internet. The modem 1772, which may be internal or external, may be connected to the system bus 1721 via the user input interface 1760, or other appropriate mechanism. In a networked environment, program modules depicted relative to the computer 1710, or portions thereof, may be stored in the remote memory storage device. By way of example, and not limitation, FIG. 17 illustrates remote application programs 1785 as residing on remote computer 1780. It will be appreciated that the network connections shown are exemplary and other means of establishing a communications link between the computers may be used.

In this specification, "a" and "an" and similar phrases are to be interpreted as "at least one" and "one or more." References to "an" embodiment in this disclosure are not necessarily to the same embodiment.

Many of the elements described in the disclosed embodiments may be implemented as modules. A module is defined here as an isolatable element that performs a defined function and has a defined interface to other elements. The modules described in this disclosure may be implemented in hardware, a combination of hardware and software, firmware, wetware (i.e. hardware with a biological element) or a combination thereof, all of which are behaviorally equivalent. For example, modules may be implemented using computer hardware in combination with software routine(s) written in a computer language (such as C, C++, FORTRAN, Java, Basic, Matlab or the like) or a modeling/simulation program (such as Simulink, Stateflow, GNU Octave, or LabVIEW MathScript). Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies may be used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) detecting objects in a cavity. However, one skilled in the art will recognize that embodiments of the invention could be used to detect malformed cavities, unexpected cavities in a body (e.g. air bubbles in a casting), and/or the like.

In addition, it should be understood that any figures that highlight any functionality and/or advantages, are presented for example purposes only. The disclosed architecture is sufficiently flexible and configurable, such that it may be utilized in ways other than those shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. An apparatus comprising:
   a) at least one waveform generator configured to:
      i) form a first frequency agile signal waveform comprising:
         (1) a first bandwidth; and
         (2) a first multitude of frequency elements between:
            (a) a first lower frequency; and
            (b) a first upper frequency; and
      ii) form a second frequency agile signal waveform comprising:
         (1) a second bandwidth; and
         (2) a second multitude of frequency elements between:
            (a) a second lower frequency; and
            (b) a second upper frequency, the second lower frequency and second upper frequency are shifted from the first lower frequency and first upper frequency respectively by a first delta frequency;
      iii) form a third frequency agile signal waveform comprising:
         (1) a third bandwidth; and
         (2) a third multitude of frequency elements between:
            (a) a third lower frequency; and
            (b) a third upper frequency, the third lower frequency and third upper frequency shifted from the first lower frequency and first upper frequency respectively by a second delta frequency that is different than the first delta frequency;
   b) at least one transmitter configured to transmit at least the first frequency agile signal waveform, the second frequency agile signal waveform, and the third frequency agile signal waveform;

c) at least one receiver configured to receive:
  i) a first return signal comprising:
    (1) a first in-phase component;
    (2) a first quadrature phase component; and
  ii) a second return signal comprising:
    (1) a second in-phase component; and
    (2) a second quadrature phase component; and
  ii) a third return signal comprising:
    (1) a third in-phase component; and
    (2) a third quadrature phase component;
d) a phase shifter configured to generate:
  i) a second phase shifted return signal by phase shifting the second return signal by the delta frequency; and
  ii) a third phase shifted return signal by phase shifting the third return signal by the second delta frequency;
e) a combiner configured to generate a combined return signal by combining:
  i) the first return signal;
  ii) the second phase shifted return signal; and
  iii) the third phase shifted return signal; and
f) a circuit configured to determine a probability of a potential target when the combined return signal exceeds a threshold.

2. The apparatus according to claim 1, wherein:
a) the at least one waveform generator is a single waveform generator;
b) the at least one transmitter is a single transmitter; and
c) the at least one receiver is a single receiver.

3. The apparatus according to claim 1, wherein at least one of the first frequency agile signal waveform and second frequency agile signal waveform comprises a step-chirp signal waveform.

4. The apparatus according to claim 1, wherein at least one of the first frequency agile signal waveform and second frequency agile signal waveform comprises a linear frequency modulated waveform.

5. The apparatus according to claim 1, wherein at least one of the first frequency agile signal waveform and second frequency agile signal waveform are phase aligned.

6. The apparatus according to claim 1, wherein the delta frequency correlates to a cutoff frequency of a target of interest.

7. The apparatus according to claim 1, wherein the first bandwidth is substantially equal to the second bandwidth.

8. The apparatus according to claim 1, wherein:
a) the at least one waveform generator is further configured to form at least one additional frequency agile signal waveform, each of the at least one additional frequency agile signal waveform comprising:
  i) an additional bandwidth; and
  ii) an additional multitude of frequency elements between:
    (1) an additional third lower frequency; and
    (2) an additional upper frequency, each of the additional lower frequency and additional upper frequency shifted from the first lower frequency and first upper frequency respectively by a different additional delta frequency that is different than:
      (a) the first delta frequency;
      (b) the second delta frequency; and
      (c) another additional delta frequency;
b) the at least one transmitter is further configured to transmit at least one of the at least one additional frequency agile signal waveform;
c) the at least one receiver is further configured to receive at least one additional return signal, each of the at least one additional return signal comprising:
  i) an additional in-phase component; and
  ii) an additional quadrature phase component;
d) the phase shifter is further configured to generate an additional phase shifted return signal for each of the at least one additional return signal by phase shifting the additional return signal by the additional delta frequency; and
e) the combiner is further configured to combine each of the at least one additional phase shifter return signal into the combined return signal.

9. A process comprising:
a) transmitting a first frequency agile signal waveform comprising:
  i) a first bandwidth; and
  ii) a first multitude of frequency elements between:
    (1) a first lower frequency; and
    (2) a first upper frequency;
b) transmitting a second frequency agile signal waveform comprising:
  i) a second bandwidth; and
  ii) a second multitude of frequency elements between:
    (1) a second lower frequency; and
    (2) a second upper frequency, the second lower frequency and second upper frequency are shifted from the first lower frequency and first upper frequency respectively by a first delta frequency;
c) transmitting at least one additional frequency agile signal waveform, each of the at least one additional frequency agile signal waveform comprising:
  i) an additional bandwidth; and
  ii) an additional multitude of frequency elements between:
    (1) an additional third lower frequency; and
    (2) an additional upper frequency, each of the additional lower frequency and additional upper frequency shifted from the first lower frequency and first upper frequency respectively by a different additional delta frequency that is different than:
      (a) the first delta frequency;
      (b) the second delta frequency; and
      (c) another additional delta frequency;
d) receiving a first return signal comprising:
  i) a first in-phase component; and
  ii) a first quadrature phase component;
e) receiving at least one additional return signal, each of the at least one additional return signal comprising:
  i) an additional in-phase component; and
  ii) an additional quadrature phase component;
f) receiving a second return signal comprising:
  i) a second in-phase component; and
  ii) a second quadrature phase component;
g) generating a second phase shifted return signal by phase shifting the second return signal by the delta frequency;
h) generating an additional phase shifted return signal for each of the at least one additional return signal by phase shifting the additional return signal by the additional delta frequency;
i) generating a combined return signal by combining:
  i) the first return signal; and
  ii) the second phase shifted return signal;
j) combining each of the at least one additional phase shifter return signal into the combined return signal; and
k) determining a probability of a potential target when the combined return signal exceeds a threshold.

10. The process according to claim 9, wherein at least one of the first frequency agile signal waveform and second frequency agile signal waveform comprises a step chirp signal waveform.

11. The process according to claim 9, wherein at least one of the first frequency agile signal waveform and second frequency agile signal waveform comprises a linear frequency modulated waveform.

12. The process according to claim 9, wherein at least one of the first frequency agile signal waveform and second frequency agile signal waveform are phase aligned.

13. The process according to claim 9, wherein the delta frequency correlating to a cutoff frequency of a target of interest.

14. The process according to claim 9, wherein the first bandwidth is equal to the second bandwidth.

15. The process according to claim 9, further comprising:
a) transmitting a third frequency agile signal waveform comprising:
   i) a third bandwidth; and
   ii) a third multitude of frequency elements between:
      (1) a third lower frequency; and
      (2) a third upper frequency, the third lower frequency and third upper frequency shifted from the first lower frequency and first upper frequency respectively by a second delta frequency that is different than the first delta frequency;
b) receiving a third return signal comprising:
   i) a third in-phase component; and
   ii) a third quadrature phase component;
c) generating a third phase shifted return signal by phase shifting the third return signal by the second delta frequency; and
d) combining the third phase shifter return signal into the combined return signal.

16. A process comprising:
a) transmitting a combined frequency agile signal waveform comprising a combination of:
   i) a first frequency agile signal waveform comprising:
      (1) a first bandwidth; and
      (2) a first multitude of frequency elements between:
         (a) a first lower frequency; and
         (b) a first upper frequency; and
   ii) a second frequency agile signal waveform comprising:
      (1) a second bandwidth; and
      (2) a second multitude of frequency elements between:
         (a) a second lower frequency; and
         (b) a second upper frequency, the second lower frequency and second upper frequency are shifted from the first lower frequency and first upper frequency respectively by a first delta frequency;
b) receiving a combined return signal;
c) splitting the return signal into at least the following:
   i) a first return signal comprising:
      (1) a first in-phase component; and
      (2) a first quadrature phase component;
   ii) a second return signal comprising:
      (1) a second in-phase component; and
      (2) a second quadrature phase component;
d) generating at least one phase shifted signal comprising generating a second phase shifted return signal by phase shifting the second return signal by the delta frequency;
e) generating a combined return signal comprises combining:
   i) the first return signal; and
   ii) the second phase shifted return signal; and
f) determining a probability of a potential target when the combined return signal exceeds a threshold.

17. The process according to claim 16, wherein at least one of the first frequency agile signal waveform and second frequency agile signal waveform comprises a step chirp signal waveform.

18. The process according to claim 16, wherein at least one of the first frequency agile signal waveform and second frequency agile signal waveform comprises a linear frequency modulated waveform.

19. The process according to claim 16, wherein at least one of the first frequency agile signal waveform and second frequency agile signal waveform are phase aligned.

20. The process according to claim 16, wherein the delta frequency correlating to a cutoff frequency of a target of interest.

21. The process according to claim 16, wherein the first bandwidth is equal to the second bandwidth.

22. The process according to claim 16, wherein:
a) the combined frequency agile signal waveform further comprises a third frequency agile signal waveform comprising:
   i) a third bandwidth; and
   ii) a third multitude of frequency elements between:
      (1) a third lower frequency; and
      (2) a third upper frequency, the third lower frequency and third upper frequency shifted from the first lower frequency and first upper frequency respectively by a second delta frequency that is different than the first delta frequency;
b) the splitting the return signal further comprises splitting the return signal into a third return signal comprising:
   i) a third in-phase component; and
   ii) a third quadrature phase component; and
c) the generating at least one phase shifted signal further comprises generating a third phase shifted return signal by phase shifting the third return signal by the second delta frequency; and
d) the generating a combined return signal further comprises combining the third phase shifter return signal into the combined return signal.

23. The process according to claim 16, wherein:
a) the combined frequency agile signal waveform further comprises at least one additional frequency agile signal waveform, each of the at least one additional frequency agile signal waveform comprising:
   i) an additional bandwidth; and
   ii) an additional multitude of frequency elements between:
      (1) an additional third lower frequency; and
      (2) an additional upper frequency, each of the additional lower frequency and additional upper frequency shifted from the first lower frequency and first upper frequency respectively by a different additional delta frequency that is different than:
         (a) the first delta frequency;
         (b) the second delta frequency; and
         (c) another additional delta frequency;
b) the splitting the return signal further comprises splitting the return signal into at least one additional return signal, each of the at least one additional return signal comprising:

i) an additional in-phase component; and
ii) an additional quadrature phase component;
c) the generating at least one phase shifted signal further comprises generating an additional phase shifted return signal for each of the at least one additional return signal by phase shifting the additional return signal by the additional delta frequency; and
d) the generating a combined return signal further comprises combining each of the at least one additional phase shifter return signal into the combined return signal.

\* \* \* \* \*